(12) United States Patent
Ueda et al.

(10) Patent No.: US 9,170,522 B2
(45) Date of Patent: Oct. 27, 2015

(54) LIGHT SCANNING DEVICE, METHOD FOR MANUFACTURING THE SAME, AND IMAGE FORMING APPARATUS WITH THE SAME

(71) Applicant: Sharp Kabushiki Kaisha, Osaka (JP)

(72) Inventors: Atsushi Ueda, Osaka (JP); Takaharu Motoyama, Osaka (JP); Ryosuke Sasaki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/383,741

(22) PCT Filed: Mar. 5, 2013

(86) PCT No.: PCT/JP2013/055909
§ 371 (c)(1),
(2) Date: Sep. 8, 2014

(87) PCT Pub. No.: WO2013/133242
PCT Pub. Date: Sep. 12, 2013

(65) Prior Publication Data
US 2015/0097909 A1  Apr. 9, 2015

(30) Foreign Application Priority Data
Mar. 7, 2012 (JP) ................................. 2012-050654

(51) Int. Cl.
| B41J 15/14 | (2006.01) |
|---|---|
| B41J 2/435 | (2006.01) |
| B41J 27/00 | (2006.01) |
| G03G 15/043 | (2006.01) |
| B41J 2/47 | (2006.01) |
| G02B 26/12 | (2006.01) |
| G03G 15/04 | (2006.01) |
| G03G 21/16 | (2006.01) |

(52) U.S. Cl.
CPC ............... *G03G 15/043* (2013.01); *B41J 2/473* (2013.01); *G02B 26/12* (2013.01); *G03G 15/04072* (2013.01); *G03G 21/1647* (2013.01); *G03G 21/1666* (2013.01)

(58) Field of Classification Search
USPC .......... 347/231–233, 238, 242, 245, 257, 263
See application file for complete search history.

(56) References Cited

U.S. PATENT DOCUMENTS

| 8,717,656 B2* | 5/2014 | Shimizu et al. ............. 359/204.1 |
| 8,922,859 B2* | 12/2014 | Takamatsu .................. 359/198.1 |
| 2012/0105563 A1* | 5/2012 | Sakita et al. .................. 347/118 |

FOREIGN PATENT DOCUMENTS

| JP | 08-171967 | 7/1996 |
| JP | 10-012315 | 1/1998 |

(Continued)

*Primary Examiner* — Hai C Pham
(74) *Attorney, Agent, or Firm* — Keating & Bennett, LLP

(57) ABSTRACT

A light scanning device includes a plurality of light-emitting elements for scanning a scan object with respective light beams emitted from the respective light-emitting elements. The light scanning device includes secured sections, a first substrate, and a second substrate. To the secured sections, the respective light-emitting elements are secured. The first substrate includes a first connector. Mounting positions of the respective light-emitting elements to the first substrate are displaceable. The respective light-emitting elements are coupled to the first substrate. The second substrate includes a second connector coupled to the first connector. The first substrate and the second substrate are secured to a first specified position and a second specified position, respectively.

11 Claims, 12 Drawing Sheets

(56) References Cited

FOREIGN PATENT DOCUMENTS

| JP | 10-324018 | 12/1998 | | |
| JP | 11-072729 | 3/1999 | | |
| JP | 2005070495 A | * | 3/2005 | ............ G02B 26/10 |
| JP | 2006072136 A | * | 3/2006 | ............ G02B 26/10 |
| JP | 2008-166095 | | 7/2008 | |
| JP | 2011-187448 | | 9/2011 | |

* cited by examiner (a)

(b)

LIGHT SCANNING DEVICE, METHOD FOR MANUFACTURING THE SAME, AND IMAGE FORMING APPARATUS WITH THE SAME

CROSS-REFERENCE TO RELATED APPLICATIONS

This application is a National Phase application filed under 35 USC 371 of PCT International Application No. PCT/JP2013/055909 with an International Filing Date of Mar. 5, 2013, which claims under 35 U.S.C. §119(a) the benefit of Japanese Application No. 2012-050654, filed Mar. 7, 2012, the entire contents of which are incorporated herein by reference.

TECHNICAL FIELD

The present invention relates to a light scanning device that scans a scan object with light beam, a method for manufacturing the light scanning device, and an image forming apparatus with the light scanning device.

BACKGROUND ART

For example, an image forming apparatus using electrophotographic system uniformly charges a photosensitive body (a scan object) surface, scans the photosensitive body surface with light beam, and forms an electrostatic latent image at the photosensitive body surface. Then, the image forming apparatus develops the electrostatic latent image on the photosensitive body surface with toner to form a toner image on the photosensitive body surface, and transfers the toner image from the photosensitive body to a recording paper sheet.

A light scanning device scans the photosensitive body surface with the light beam. This light scanning device includes a light-emitting element such as a semiconductor laser, a plurality of mirrors such as polygonal mirrors, and a plurality of lenses such as fθ lenses. The light-emitting element emits a light beam. The polygonal mirrors reflect the light beam. The plurality of lenses deflect the light beam. The light beam from the semiconductor laser is guided to the photosensitive body surface by an optical member such as the respective mirrors and the respective lenses. The photosensitive body surface is scanned with the light beam, thus an electrostatic latent image is formed on the photosensitive body surface.

With the light scanning device, a position and a direction of a light emission surface of the light-emitting element need to be adjusted at high accuracy so as to form a condensation spot of the light beams on the photosensitive body surface. Additionally, a position of a main-scanning line on the photosensitive body surface with the light beam needs to be set.

For example, the light-emitting element is mounted on a substrate. After the substrate is mounted on an apparatus main body, a mounting position on the substrate to the apparatus main body is adjusted, thus the position and the direction of the light emission surface of the light-emitting element are adjusted. However, to make the mounting position on the substrate adjustable, increasing a size of a hole at the substrate through which a securing screw is passed, or providing a margin for the mounting space for the substrate is required.

Regarding color images, light-emitting elements corresponding to respective magenta, cyan, yellow, and black are required. However, if the respective light-emitting elements are mounted on a single common substrate, even if the mounting position on the common substrate is adjusted, the position and the direction of the light emission surfaces of the respective light-emitting elements cannot be individually adjusted. Accordingly, in Patent Literature 1, the respective light-emitting elements are mounted on different substrates, and the mounting positions for these substrates are adjusted. However, in this case, the number of components of the respective substrates or a similar component is increased. Additionally, margins need to be provided to the mounting spaces on the substrates depending on the respective substrates. Thus, the apparatus main body will be a large size.

It is also possible to adjust the position and the direction of the light emission surfaces of the light-emitting elements, secure the light-emitting elements to the apparatus main body, and then mount the light-emitting elements on the substrates. For example, in Patent Literature 2, optical axes of respective light-emitting elements corresponding to magenta, cyan, yellow, and black are adjusted. The respective light-emitting elements are secured to a housing of an apparatus. Afterward, terminals of the respective light-emitting elements are inserted into respective sockets secured to a single substrate, thus the substrate is secured to a specified position. However, positions of the terminals of the respective light-emitting elements secured to a housing and positions of the respective sockets, which are secured to the substrate, may be shifted. If this happens, it is difficult to insert the terminals of the respective light-emitting elements into the respective sockets, or a load is applied on the terminals of the respective light-emitting elements, resulting in shifting of positions of the optical axes of the respective light-emitting elements.

That is, in the case where a light-emitting element is mounted on the substrate and then the mounting position on the substrate is adjusted like disclosed in Patent Literature 1, a margin for the mounting space on the substrate needs to be provided, causing a problem of a large-size apparatus main body. Alternatively, like disclosed in Patent Literature 2, in the case where the light-emitting elements are secured, and then the terminals of the light-emitting elements are inserted into the sockets on the substrate to secure the substrate to a specified position, if the positions of the terminals of the light-emitting elements and the position s of the sockets on the substrate are shifted, it is difficult to insert the terminals of the light-emitting elements into the sockets, and a load is applied on the terminals of the light-emitting elements, casing a problem of shifting of positions of optical axes of the light-emitting elements.

On the other hand, to a substrate on which the light-emitting elements are mounted (referred to as a drive substrate), a driving circuit for light-emitting elements is formed. A control substrate at which a control circuit for controlling the driving circuit is formed is coupled to this drive substrate. For example, in Patent Literature 3, a drive substrate and a control substrate are coupled via a flexible harness. However, with a configuration where a laser diode that emits a plurality of light-emitting elements and multibeam is employed, the number of wirings coupling the respective substrates is increased. Accordingly, an influence of noise to the harness is increased. In view of this, it is preferred that connectors of the respective substrates are directly coupled to one another (Board to Board).

However, as disclosed in Patent Literature 1, in the case where the light-emitting element is mounted on the drive substrate, and then the mounting position on the drive substrate is adjusted, the position of the drive substrate changes. Accordingly, the position of the control substrate first needs to be aligned at the position of the drive substrate, and then a connector of the control substrate needs to be coupled to the connector of the drive substrate. Accordingly, a sufficient margin needs to be provided at the mounting space on the control substrate, resulting in a large-size apparatus main body. In the case where the mounting positions on the respective drive substrates on which the respective light-emitting elements corresponding to magenta, cyan, yellow, and black are mounted are individually adjusted, since positional relationships of the connectors of the respective drive substrates change, coupling connectors of a single control substrate to the connectors of the respective drive substrates is substantially impossible.

As disclosed in Patent Literature 2, in the case where the light-emitting elements are secured and the terminals of the light-emitting elements are inserted into the sockets of the drive substrate to secure the drive substrate to the specified position, coupling the connector of the drive substrate to the connector of the control substrate is easy. However, it is difficult to insert the terminal of the light-emitting element into the socket, leaving a problem that a load is applied on the terminals of the light-emitting elements or a similar problem.

CITATION LIST

Patent Literature

PATENT LITERATURE 1: Japanese Unexamined Patent Application Publication No. 2006-227494
PATENT LITERATURE 2: Japanese Unexamined Patent Application Publication No. 2011-187448
PATENT LITERATURE 3: Japanese Unexamined Patent Application Publication No. 2004-287292

SUMMARY OF INVENTION

Technical Problem

Thus, in Patent Literature 1, a margin is required to be provided for the mounting space on the drive substrate and has a problem of the large-size apparatus main body. In Patent Literature 2, when the positions of the terminals of the light-emitting elements and the positions of the sockets at the drive substrate side are shifted, it is difficult to insert the terminals of the light-emitting elements into the sockets, or this causes a problem that a load is applied on the terminals of the light-emitting elements, shifting the positions of the optical axes of the light-emitting elements.

Meanwhile, as disclosed in Patent Literature 3, coupling the drive substrate and the control substrate via a flexible harness is not preferred in that the drive substrate and the control substrate become likely to be affected by noise. Accordingly, directly coupling the connector of the drive substrate and the connector of the control substrate is preferred. However, in Patent Literature 1, since the position of the drive substrate changes, a sufficient margin needs to be provided also for the mounting space on the control substrate for directly coupling the connector of the drive substrate and the connector of the control substrate, resulting in a large-size apparatus main body. In Patent Literature 2, even if such direct coupling of the connectors is easy, it is difficult to insert the terminals of the light-emitting elements into the sockets, or a load is applied on the terminals of the light-emitting elements, leaving a problem of shifting of the positions of the optical axes of the light-emitting elements.

The present invention has been made to solve the above-described conventional problems, and it is an object of the present invention to provide a light scanning device, a method for manufacturing the light scanning device, and an image forming apparatus that includes the light scanning device. With the light scanning device, a margin needs not to be provided for the mounting space on the drive substrate on which the light-emitting element is mounted, and the load is not applied on the terminals of the respective light-emitting elements, thus facilitating the direct coupling between the connector of the drive substrate and the connector of the control substrate.

Solutions to the Problems

To solve the above-described problems, a light scanning device of the present invention is a light scanning device including a plurality of light-emitting elements for scanning a scan object with respective light beams emitted from the respective light-emitting elements. The light scanning device includes secured sections, a first substrate, and a second substrate. To the secured sections, the respective light-emitting elements are secured. The first substrate includes a first connector. Mounting positions of the respective light-emitting elements to the first substrate are displaceable. The respective light-emitting elements are coupled to the first substrate. The second substrate includes a second connector coupled to the first connector. The first substrate and the second substrate are secured to a first specified position and a second specified position, respectively.

In the present invention, in a state where the mounting positions of the respective light-emitting elements on the first substrate are displaced, the respective light-emitting elements are coupled to the first substrate. In view of this, according to the first specified position at the first substrate, the mounting positions of the respective light-emitting elements can be adjusted and configured. Afterwards, coupling the respective light-emitting elements to the first substrate avoids applying a load on the terminals of the respective light-emitting elements. Thus, shifting of the direction and the position of the light emission surfaces of the respective light-emitting elements can be prevented. Since the first substrate and the second substrate are secured to the first specified position and the second specified position, respectively. This allows directly coupling the first connector of the first substrate and the second connector of the second substrate (Board to Board), allowing minimizing the mounting spaces on the first and the second substrates.

In the light scanning device of the present invention, the second substrate may be larger than the first substrate. The second substrate may cover the first substrate and being secured to the second specified position.

This allows saving the mounting spaces on the first and the second substrates, allowing achieving a small-size light scanning device.

Further, in the light scanning device of the present invention, the first substrate includes shared holes by the respective light-emitting elements, respective terminals of the light-emitting element are inserted together into the shared hole. The respective terminals of the light-emitting element may be moved at an inside of the shared hole so as to displace the mounting positions of the respective light-emitting elements.

By thus inserting the respective terminals of the light-emitting element into the shared hole and moving the respective terminals, the mounting positions of the light-emitting element can be displaced.

In the light scanning device of the present invention, the shared hole may be larger than a smallest circumference encompassing the respective terminals of the light-emitting element.

Further, in the light scanning device of the present invention, respective regions at the shared hole into which the respective terminals of the light-emitting element are to be inserted may be formed larger than outer diameters of the respective terminals.

This allows inserting the respective terminals of the light-emitting element into the shared hole and moving the respective terminals.

In the light scanning device of the present invention, a wiring pattern may be formed at a part outside of a peripheral edge of the shared hole at the first substrate. The terminals of the respective light-emitting elements may be coupled to the wiring patterns.

This allows soldering the terminals of the light-emitting element to the first substrate without excessive load on the terminals of the light-emitting element.

Further, in the light scanning device of the present invention, a housing of the light scanning device includes a plurality of wall sections. The first substrate and the second substrate may be arranged in parallel to one wall section among the respective wall sections. The first substrate and the second substrate may be formed smaller than the one wall section.

This allows overlapping the first substrate and the second substrate to the wall section while avoiding the first substrate and the second substrate to project from the wall section of the housing of the light scanning device. This allows saving the mounting spaces on the first and the second substrates, allowing achieving a small-size light scanning device.

In the light scanning device of the present invention, the one wall section may be a wall section that has a smallest area among the respective wall sections.

This further allows achieving a small-size light scanning device.

In the light scanning device of the present invention, the respective light-emitting elements may be laser diodes that emit a plurality of light beams.

In the respective light-emitting elements, the directions and the positions of the light emission surfaces need to be highly accurately configured. Accordingly, an application of the present invention is effective.

Next, in an image forming apparatus of the present invention, the light scanning device includes the light scanning device according to the above-described present invention. The light scanning device is configured to form a latent image on a scan object. The light scanning device is configured to develop the latent image on the scan object into a visible image. The light scanning device is configured to transfer and form the visible image from the scan object to a paper sheet.

Even in the image forming apparatus of the present invention, operational advantages similar to the light scanning device of the present invention are achieved.

Next, a method for manufacturing a light scanning device of the present invention includes a plurality of light-emitting elements for scanning a scan object with respective light beams emitted from the respective light-emitting elements. The method for manufacturing the light scanning device includes: a step of securing the respective light-emitting elements to secured sections of the light scanning device, a step of securing a first substrate to a first specified position of the light scanning device, a step of coupling the respective light-emitting elements to the first substrate by adjusting and configuring mounting positions on the first substrate where the respective light-emitting elements are displaceable, and a step of securing the second substrate to a second specified position of the light-emitting element by coupling a second connector of the second substrate to a first connector of the first substrate.

Even with the image forming apparatus of the present invention, operational advantages similar to the light scanning device of the present invention are achieved.

Advantageous Effects of Invention

With the present invention, in a state where the mounting positions of the respective light-emitting elements on the first substrate are displaced, the respective light-emitting elements are coupled to the first substrate. In view of this, according to the first specified position at the first substrate, the mounting positions of the respective light-emitting elements can be adjusted and configured. Afterwards, coupling the respective light-emitting elements to the first substrate avoids applying a load on the terminals of the respective light-emitting elements. Thus, shifting of the direction and the position of the light emission surfaces of the respective light-emitting elements can be prevented. Since the first substrate and the second substrate are secured to the first specified position and the second specified position, respectively. This allows directly coupling the first connector of the first substrate and the second connector of the second substrate (Board to Board), allowing minimizing the mounting spaces on the first and the second substrates.

DESCRIPTION OF EMBODIMENTS

Hereinafter, embodiments of the present invention will be described with reference to the drawings.

Figure 1:
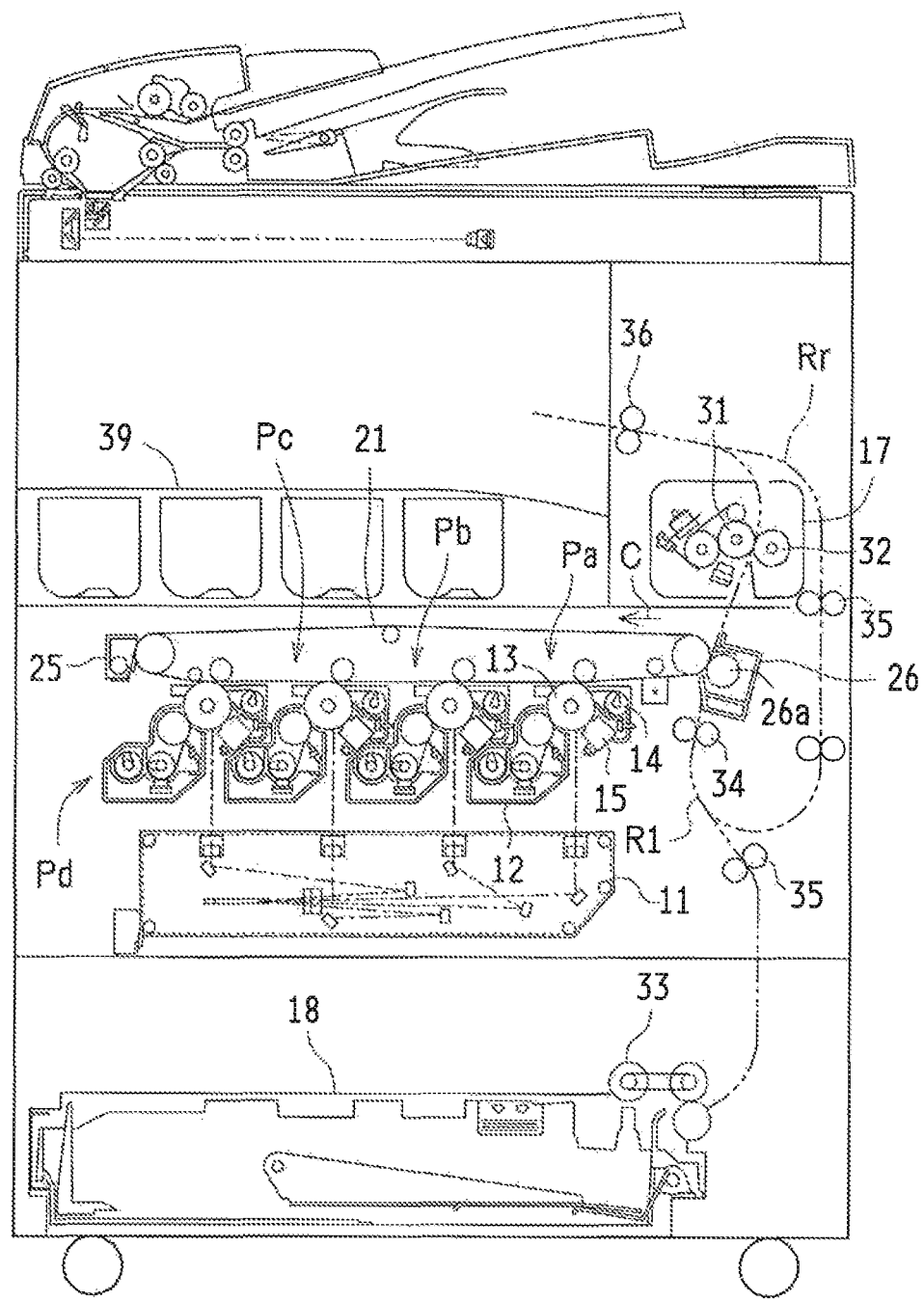
FIG. 1 is a cross-sectional view illustrating an image forming apparatus with a light scanning device of one embodiment of the present invention.

FIG. 1 is a cross-sectional view illustrating an image forming apparatus with a light scanning device of one embodiment of the present invention. Image data that an image forming apparatus 1 handles correspond to color images using respective colors of black (K), cyan (C), magenta (M), and yellow (Y), or corresponds to a monochrome image using a single color (for example, black). In view of this, a developing apparatus 12, a photosensitive drum 13, a drum cleaning apparatus 14, a charging unit 15, and a similar apparatus or unit are disposed for each of four to form four types of toner images according to the respective colors. Each apparatus or unit corresponds to black, cyan, magenta, and yellow. Thus, four image stations Pa, Pb, Pc, and Pd are constituted.

The drum cleaning apparatuses 14 remove and recover residual toner at the surfaces of the photosensitive drums 13 of all of the respective image stations Pa, Pb, Pc, and Pd. Then, the charging units 15 uniformly charge the surfaces of the photosensitive drums 13 at a predetermined electric potential. A light scanning device 11 exposes the surfaces of the photosensitive drums 13 to form electrostatic latent images at the surfaces. Then, the developing apparatus 12 develops the electrostatic latent images on the surfaces of the photosensitive drums 13 and form toner images at the surfaces of the photosensitive drums 13. Thus, a toner image with each color is formed at the surface of the photosensitive drum 13.

Subsequently, while an intermediate transfer belt 21 is moved around an arrow direction C, a belt cleaning apparatus 25 removes and recovers residual toner at the intermediate transfer belt 21. Then, toner image with each color at the surface of the photosensitive drum 13 is sequentially transferred and superimposed to the intermediate transfer belt 21, thus a color toner image is formed on the intermediate transfer belt 21.

A nip region is formed between the intermediate transfer belt 21 and a transfer roller 26a of a secondary transfer apparatus 26. A recording paper sheet conveyed through a paper sheet transport path Rl is conveyed while being sandwiched by the nip region. The color toner image on the surface of the intermediate transfer belt 21 is transferred on the recording paper sheet. Then, the recording paper sheet is sandwiched between a heating roller 31 and a pressing roller 32 of a fixing apparatus 17, and heated and pressurized for fixing the color toner image on the recording paper sheet.

On the other hand, a pickup roller 33 extracts the recording paper sheets from a paper feed tray 18. The recording paper sheets are conveyed through the S-shaped paper sheet transport path Rl, pass through the secondary transfer apparatus 26 and the fixing apparatus 17, and then are transported to a discharge tray 39 via a discharge roller 36. This paper sheet transport path Rl includes one set of registration rollers 34, a plurality sets of conveyance rollers 35, one set of discharge rollers 36, or a similar part. The registration rollers 34 start conveying the recording paper sheets matching transfer timing of the toner image at the nip region between the intermediate transfer belt 21 and the transfer roller 26a after the recording paper sheets are once stopped and the top of the recording paper sheets are aligned. The conveyance rollers 35 promote conveyance of the recording paper sheets.

In the case where not only the front surface but also the back surface of the recording paper sheet is printed, the recording paper sheet is conveyed in the opposite direction from the respective discharge rollers 36 to an inverting path Rr and the front and back of the recording paper sheet are inverted. Next, the recording paper sheet is again guided to the respective registration rollers 34. Finally, similar to the front surface of the recording paper sheet, an image is recorded and fixed on the back surface of the recording paper sheet, and the recording paper sheet is carried out to the discharge tray 39.

Figure 2:
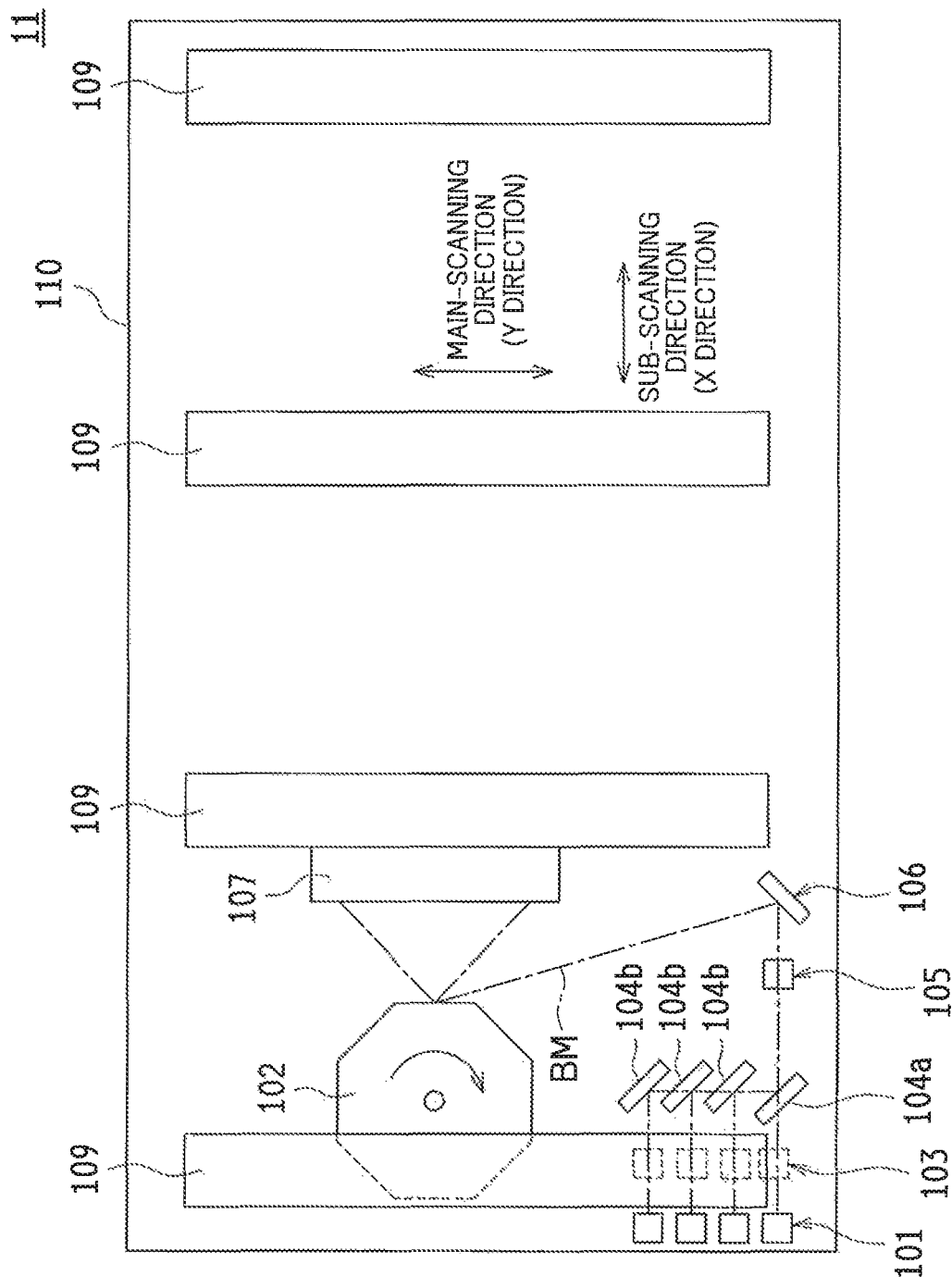
FIG. 2 is a schematic view illustrating a main part inside of a housing when viewing the light scanning device of FIG. 1 from upward.
Figure 3:
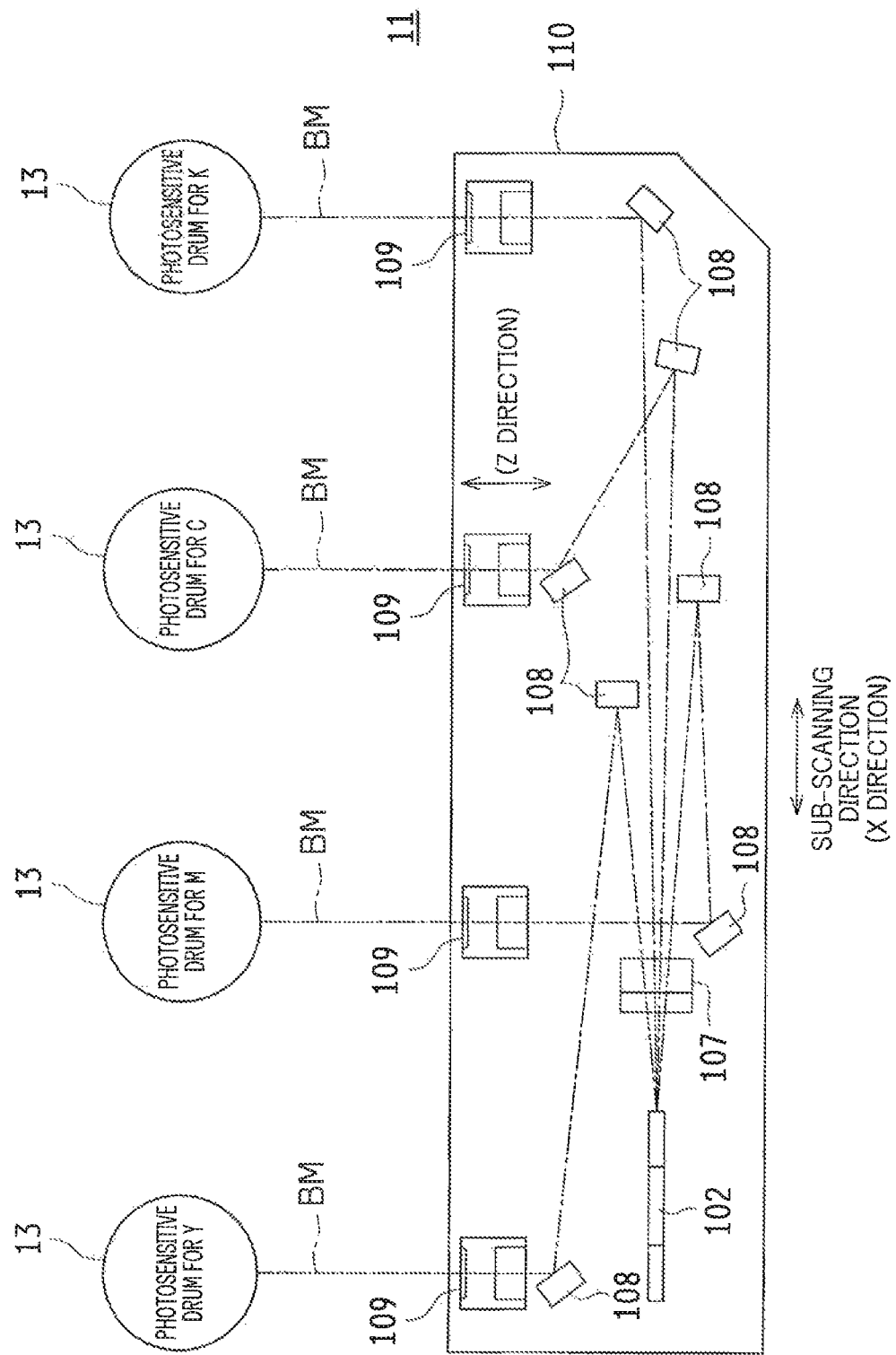
FIG. 3 is a side view schematically illustrating the main part inside of the housing when viewing the light scanning device from a side together with photosensitive drums.
Figure 4:
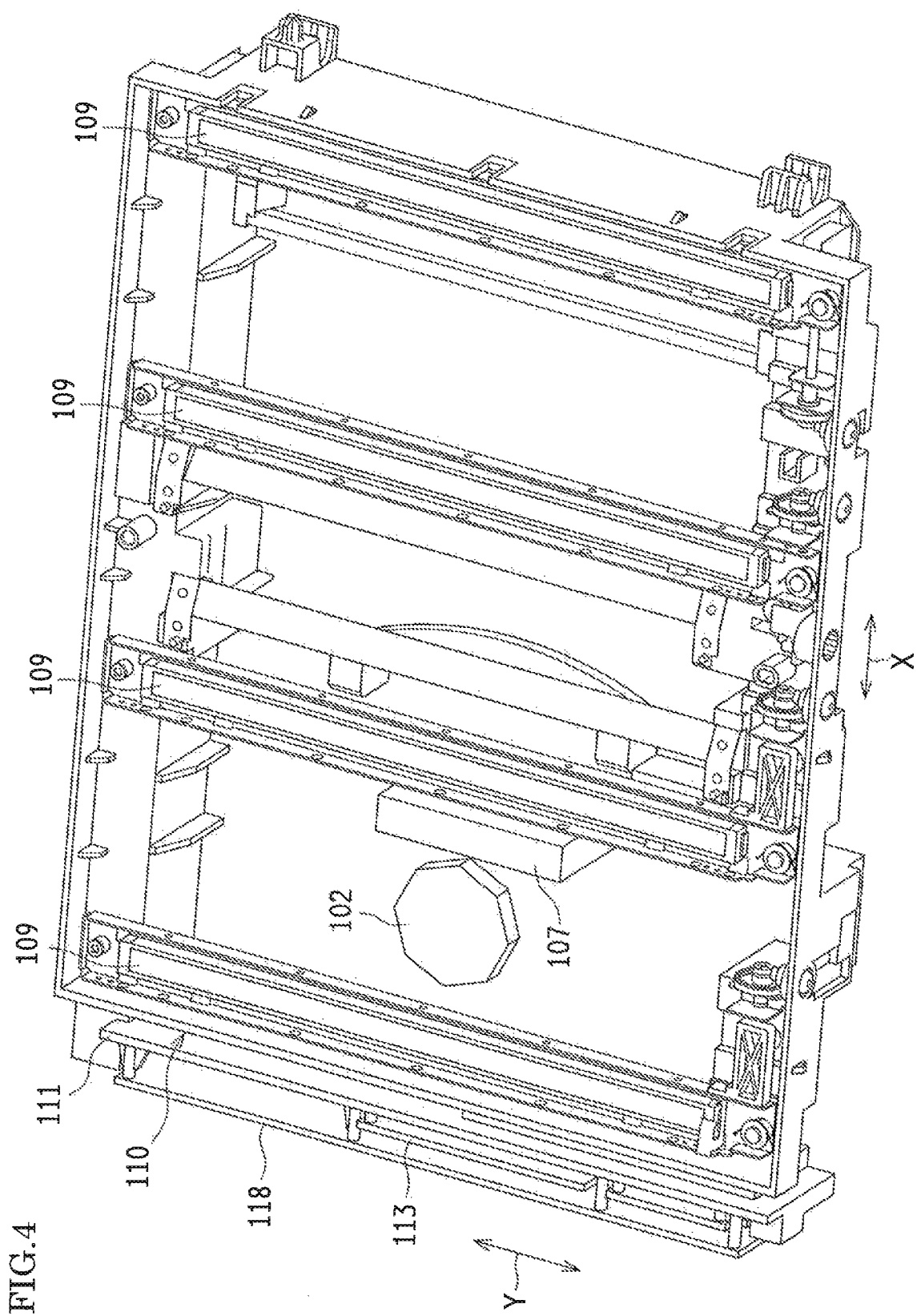
FIG. 4 is a perspective view illustrating the main part of the light scanning device with an upper lid removed.

Next, the constitution of the light scanning device 11 of this embodiment will be described in detail using FIG. 2 to FIG. 4. FIG. 2 and FIG. 3 are schematic views illustrating an inside of a housing 110 of the light scanning device 11 of FIG. 1 viewed from upward and a side. FIG. 3 also illustrates photosensitive drums 13. FIG. 4 is a perspective view illustrating a main part of the light scanning device 11 with an upper lid removed.

The light scanning device 11 guides light beams BM emitted from respective four semiconductor lasers 101 to respective reflecting surfaces of a polygonal mirror 102. The polygonal mirror 102 is rotatably driven in an arrow direction with optical elements such as mirrors and lenses. The light scanning device 11 causes the light beams BM to reflect and deflect at the respective reflecting surfaces of the polygonal mirror 102. The light scanning device 11 guides the reflected light beams BM to the respective photosensitive drums 13 with the optical elements such as the mirrors and the lenses. The light scanning device 11 scans the photosensitive drums 13 with the respective light beams BM.

From the semiconductor lasers 101 to the polygonal mirror 102, in an order of heading from the four semiconductor lasers 101 to the polygonal mirror 102, four collimator lenses 103, four first mirrors 104a and 104b, a cylindrical lens 105, and a second mirror 106 are arranged.

The collimator lenses 103 convert the light beams BM emitted from the respective semiconductor lasers 101 into collimated lights. The three first mirrors 104b reflect the light beams BM entered through the respective collimator lenses 103 from the three semiconductor lasers 101 at the one first mirror 104a. The one first mirror 104a is a half mirror. The one first mirror 104a reflects the light beams BM reflected by the respective three first mirrors 104b at the cylindrical lens 105. The one first mirror 104a causes the light beam BM entered from the other one semiconductor laser 101 through the collimator lens 103 to transmit and to enter the cylindrical lens 105. The cylindrical lens 105 condenses the light beams BM such that the light beams BM are almost condensed at the reflecting surface of the polygonal mirror 102 in a sub-scanning direction X. The cylindrical lens 105 emits the light beams BM intact as the collimated lights in a main-scanning direction Y perpendicular to the sub-scanning direction X. The second mirror 106 reflects the light beams BM from the cylindrical lens 105 such that the light beams BM enter the polygonal mirror 102.

Next, from the polygonal mirror 102 to the photosensitive drums 13, in an order heading from the polygonal mirror 102 to the photosensitive drums 13, a first fθ lens 107, a plurality of emission turning mirrors 108, and four second fθ lenses 109 are arranged.

The first fθ lens 107 converts diffused lights of the light beams BM emitted from the polygonal mirror 102 into collimated lights in the sub-scanning direction X. The first fθ lens 107 condenses and emits the collimated lights of the laser beams BM emitted from the polygonal mirror 102 such that the laser beams BM have a predetermined beam diameter on the surfaces of the photosensitive drums 13 in the main-scanning direction Y. The first fθ lens 107 converts the laser beams BM, which is deflected at a constant angular velocity in the main-scanning direction Y by a constant angular velocity motion of the polygonal mirror 102, such that the laser beams BM move at a constant linear velocity along the main scanning line on the photosensitive drums 13.

The respective emission turning mirrors 108 reflect the respective light beams BM passing through the first fθ lens 107 such that the light beams BM enter the respective second fθ lenses 109. The second fθ lens 109 condenses the collimated lights of the laser beams BM in the sub-scanning direction X such that the laser beams BM may have a predetermined beam diameter on the respective photosensitive drums 13. In the main-scanning direction Y, the second fθ lens 109 causes the light beams BM, which have been converted into convergent lights in the first fθ lens 107, to directly enter the respective photosensitive drums 13.

With the light scanning device 11, the respective light beams BM are reflected by the reflecting surfaces of the polygonal mirror 102 and are deflected, enter the respective photosensitive drums 13 passing through the respective optical paths, and repeatedly perform main scanning on the surfaces of the respective photosensitive drums 13. On the other hand, since the photosensitive drums 13 are rotatably driven, the light beams BM scan two-dimensional surfaces (circumference surfaces) of the respective photosensitive drums 13, thus electrostatic latent images are formed on the surfaces of the photosensitive drums 13.

The following describes a secured structure and a coupling structure of the respective semiconductor lasers 101. In the rough structure, in a state where the position, the direction, and the rotation angle of the light emission surfaces of the respective semiconductor lasers 101 are highly accurately adjusted, the respective semiconductor lasers 101 are secured to holes of a side plate 111 (illustrated in FIG. 4) of the housing 110 of the light scanning device 11. Then, without shifting the position, the direction, and the rotation angle of the light emission surfaces of the respective semiconductor lasers 101, the semiconductor lasers 101 are mounted on a drive substrate 113 (illustrated in FIG. 4). The drive substrate 113 is secured to the first specified position at the side plate 111 of the housing 110. Further, the first connector of the drive substrate 113 and the second connector of the control substrate 118 (illustrated in FIG. 4) are coupled. Thus, the control substrate 118 is secured to the second specified position at the side plate 111 of the housing 110.

Figure 5:
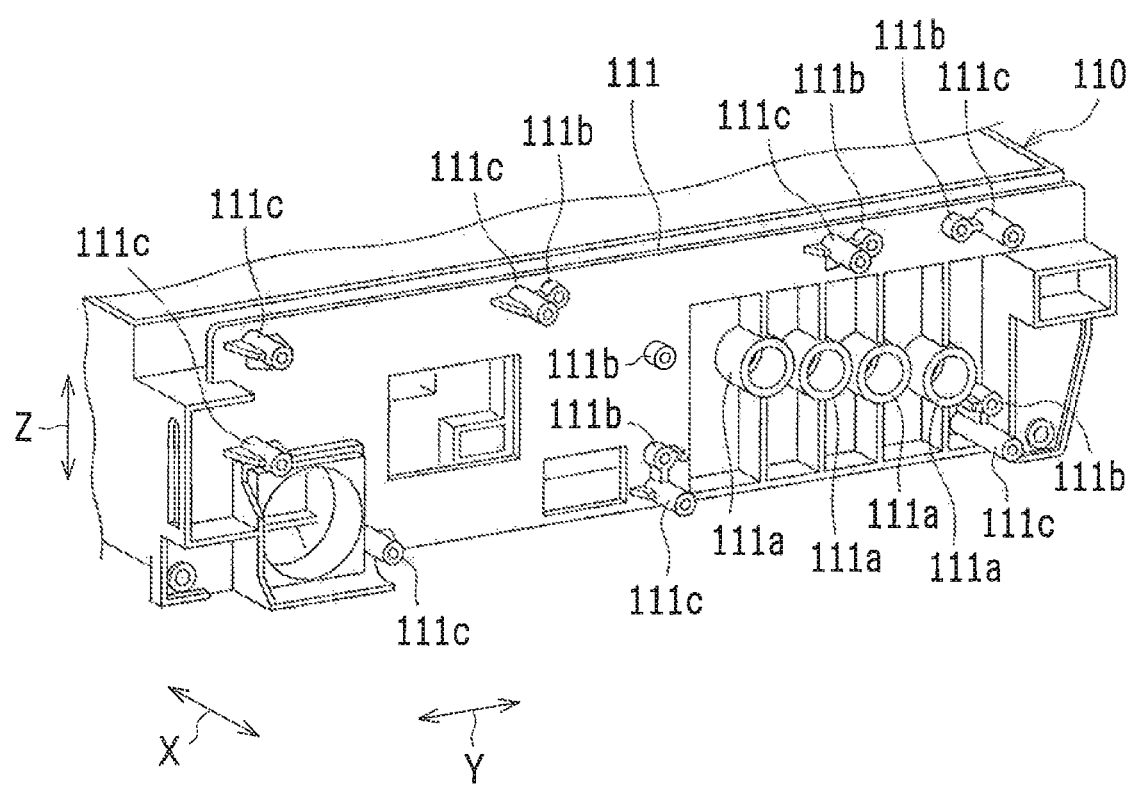
FIG. 5 is a perspective view illustrating a side plate or a similar member of the housing of the light scanning device when viewing the housing from an opposite direction to FIG. 4.
Figure 6:
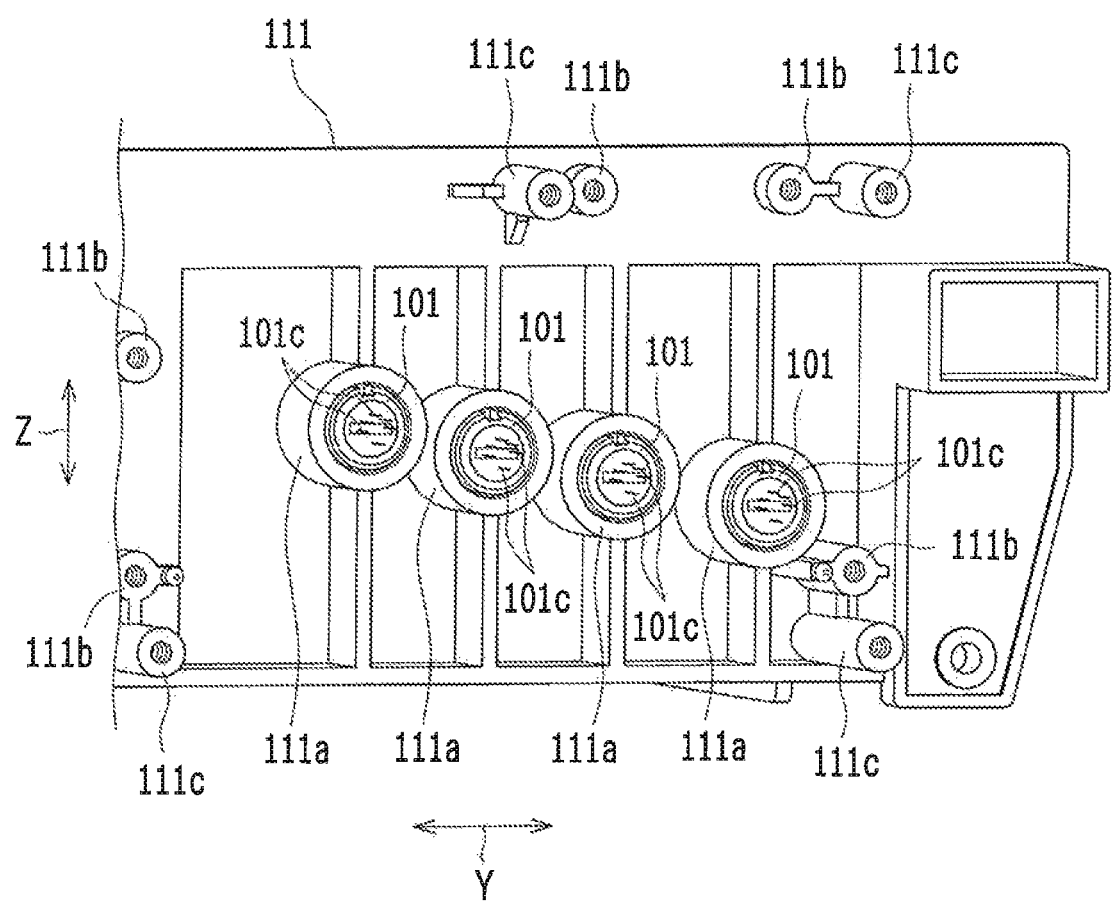
FIG. 6 is a perspective view illustrating a secured structure of respective semiconductor lasers to holes on a side plate of the housing.
Figure 7:
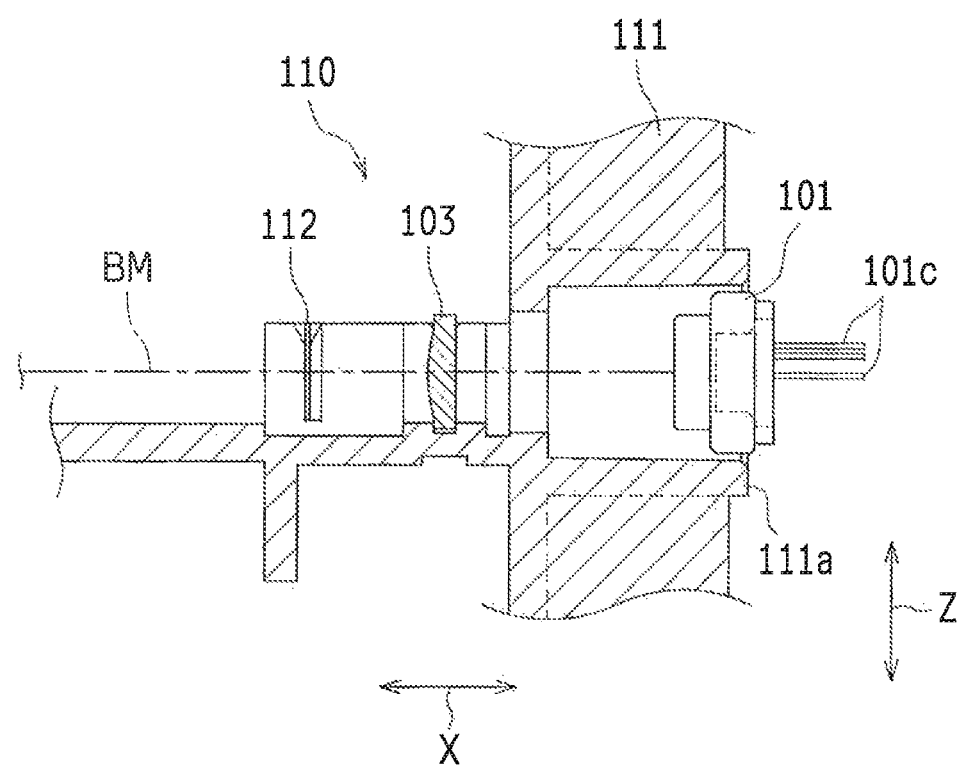
FIG. 7 is a cross-sectional view illustrating the secured structure of the semiconductor laser to the hole on the side plate of the housing.

First, the following describes the secured structure of the semiconductor lasers 101 in detail. FIG. 5 is a perspective view illustrating the side plate 111 or a similar member of the housing 110 of the light scanning device 11 when viewing the housing 110 from an opposite direction to FIG. 4. FIG. 6 is a perspective view illustrating a secured structure of the respective semiconductor lasers 101 to holes on the side plate 111 of the housing 110. FIG. 7 is a cross-sectional view illustrating the secured structure of the semiconductor laser 101 to the hole on the side plate 111 of the housing 110.

With the light scanning device 11 of this embodiment, areas of the side plate 111 extending the housing 110 in the main-scanning direction Y and the other side plate facing the side plate 111 are smaller than an area of respective other side plates extending the housing 110 in the sub-scanning direction X. The respective semiconductor lasers 101 are secured to the side plates 111 with smaller area.

As illustrated in FIG. 5, defining the sub-scanning direction X, the main-scanning direction Y, and a height direction Z perpendicular to the directions X and Y, the side plate 111 is disposed parallel to the Y-Z plane and includes four cylindrical bodies 111a projecting in the sub-scanning direction X. As illustrated in FIG. 6, the semiconductor lasers 101 are inserted into and secured to inner holes of respective cylindrical bodies 111a. As illustrated in FIG. 7, a collimator lens 103 and an aperture 112 are arranged at the inside of the housing 110. Thus, the light beam BM is emitted from the semiconductor laser 101 through the collimator lens 103 and the aperture 112.

Here, an inner diameter of the cylindrical body 111a of the side plate 111 is configured larger than an outer diameter of the semiconductor laser 101. An adhesive (for example, an ultraviolet curing epoxy resin) is applied on an outer circumference of the semiconductor laser 101. The semiconductor laser 101 is inserted into the inner hole of the cylindrical body 111a of the side plate 111. Then, the adhesive is filled in a gap between the outer circumference of the semiconductor laser 101 and the inner circumference of the cylindrical body 111a. Then, in all of the sub-scanning direction X, the main-scanning direction Y, and the height direction Z, the direction and the position of the light emission surface of the semiconductor laser 101 are adjusted at high accuracy. A rotation angle of the light emission surface of the semiconductor laser 101 is also adjusted at high accuracy. Then, the adhesive, which is filled in the gap between the outer circumference of the semiconductor laser 101 and the inner circumference of the cylindrical body 111a, is hardened. The semiconductor laser 101 is secured to the inside of the cylindrical body 111a. Thus, the direction, the position, and the rotation angle of the light emission surface of the semiconductor laser 101 are secured.

The semiconductor laser 101 is thus adjusted due to the following reasons. When the light scanning device 11 is mounted on a predetermined position inside of the image forming apparatus 1, condensation spots of the light beams BM at the respective semiconductor lasers 101 are formed at the surfaces of the respective photosensitive drums 13. Additionally, positions of main-scanning lines on the surfaces of the respective photosensitive drums 13 with the light beams BM are set.

Figure 8:
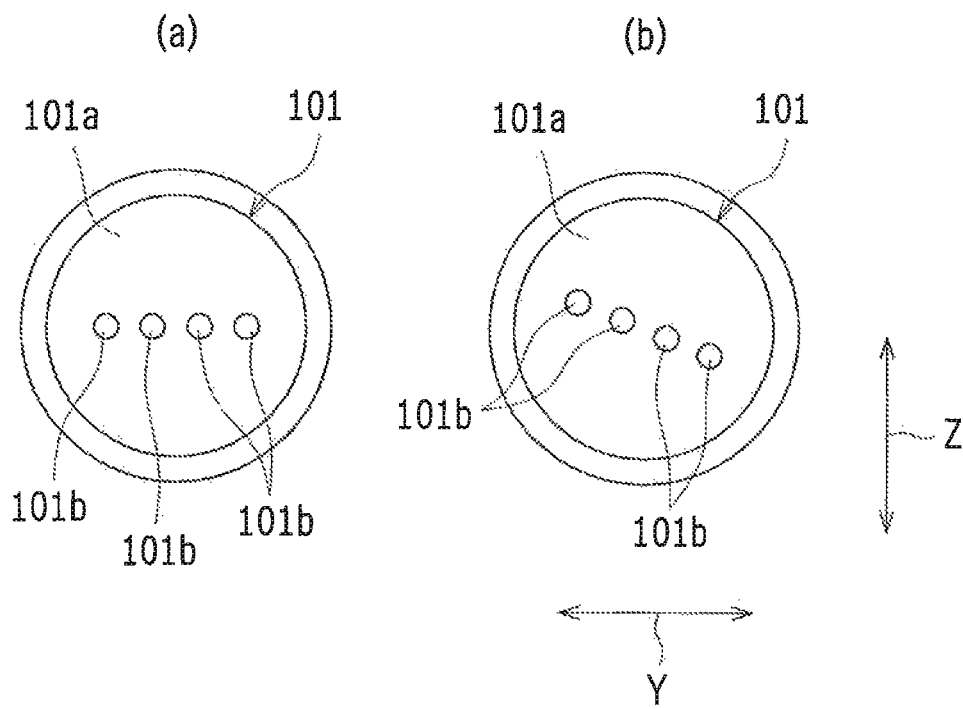
FIG. 8A is a plan view illustrating a light emission surface of the semiconductor laser.
FIG. 8B is a plan view illustrating the rotating light emission surface of the semiconductor laser.

FIG. 8A illustrates a light emission surface 101a of the semiconductor laser 101. As illustrated in FIG. 8A, at the light emission surface 101a of the semiconductor laser 101, four emission ports 101b for the light beams BM are formed. The respective emission ports 101b are aligned in a row at constant intervals. In all of the sub-scanning direction X, the main-scanning direction Y, and the height direction Z, the position and the direction of the light emission surface 101a of the semiconductor laser 101 are adjusted. As illustrated in FIG. 8B, the rotation angle of the light emission surface 101a of the semiconductor laser 101 is adjusted, and the intervals between the respective emission ports 101b in the height direction Z are adjusted. Then, the semiconductor laser 101 is secured at the inside of the cylindrical body 111a of the side plate 111.

Thus, in a state where the directions, the positions, and the rotation angles of the light emission surfaces of the respective semiconductor lasers 101 are set and secured, the light emission surfaces of the respective semiconductor lasers 101 face the inside of the housing 110 in the sub-scanning direction X. Terminals 101c of the respective semiconductor lasers 101 project toward outside of the housing 110. All the semiconductor lasers 101 are laser diodes emitting the four light beams BM (multibeams). The semiconductor laser 101 each has the six terminals 101c. Accordingly, the six terminals 101c project from each of the semiconductor lasers 101 toward the outside of the housing 110.

Figure 9:
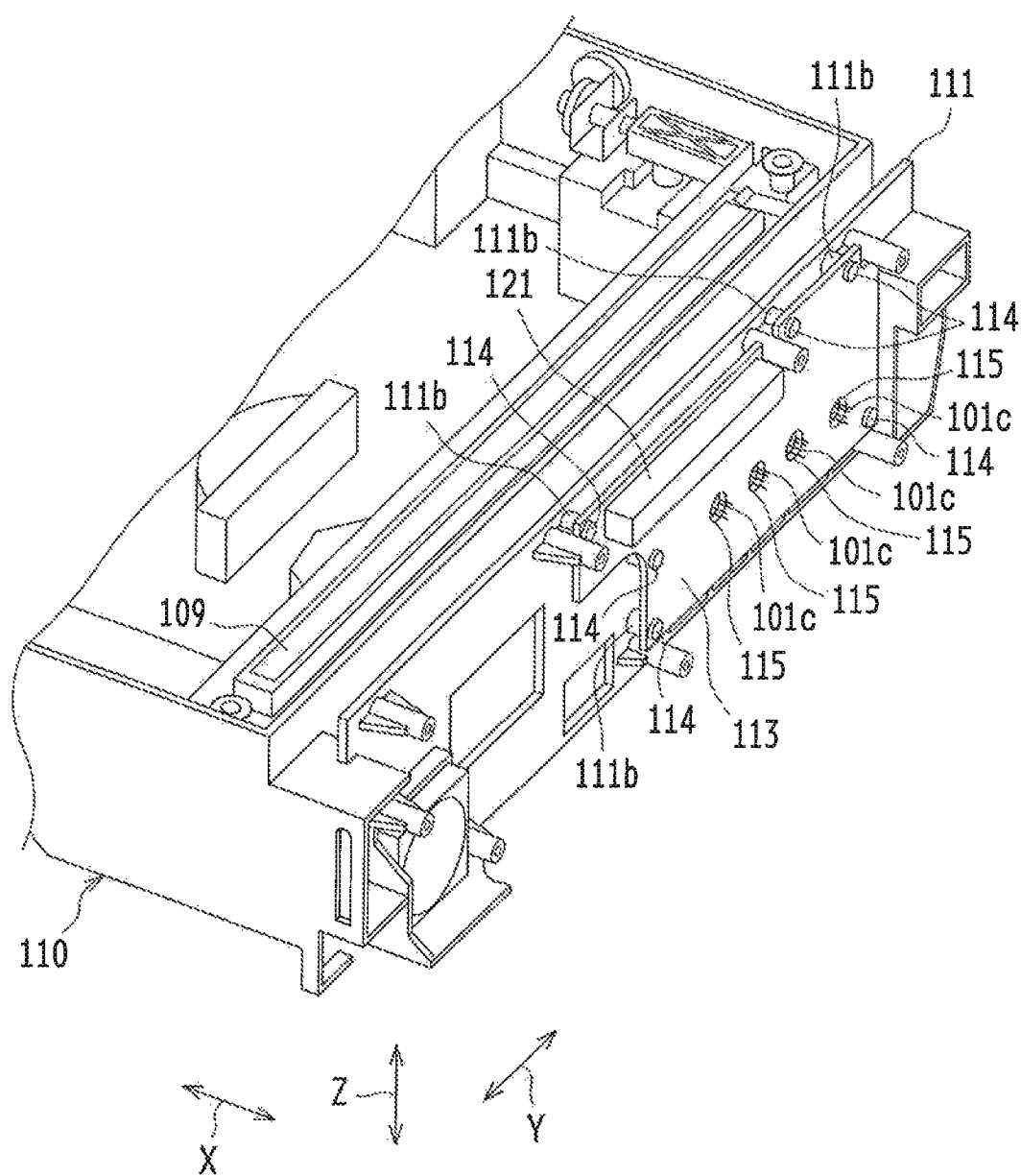
FIG. 9 is a perspective view illustrating a state where a drive substrate for driving the semiconductor laser is secured to a first specified position at the side plate of the housing.

The following describes a drive substrate with a driving circuit for driving the respective semiconductor lasers 101 in detail. FIG. 9 is a perspective view illustrating a state where the drive substrate 113 is secured to the first specified position at the side plate 111 of the housing 110. As illustrated in FIG. 9, the drive substrate 113 is a rectangular-shaped substrate smaller than the side plate 111. The drive substrate 113 has respective screw holes at a plurality of locations on the peripheral edge portions. Portions of the respective screw holes at the drive substrate 113 are brought in contact with six bosses 111b (illustrated in FIG. 5). The six bosses 111b have the same height and project from the side plate 111. Screws 114 are screwed into holes of the respective bosses 111b through the respective screw holes, thus securing the drive substrate 113 to the first specified position.

The drive substrate 113 has four shared holes 115 corresponding to the respective semiconductor lasers 101 by the respective semiconductor lasers 101, the six terminals 101c of the semiconductor laser 101 are inserted into the one shared hole 115. The shared hole 115 is formed larger than a hexagonal region formed by connecting the apices of the respective terminals 101c of the semiconductor laser 101. In other words, the shared hole 115 has a size inside of which the respective terminals 101c of the semiconductor laser 101 can be displaced in the main-scanning direction Y and the height direction Z. Surely, the semiconductor lasers 101 can be inserted into and removed from the shared hole 115 to displace the respective terminals 101c of the semiconductor laser 101 also in the sub-scanning direction X.

Figure 10:
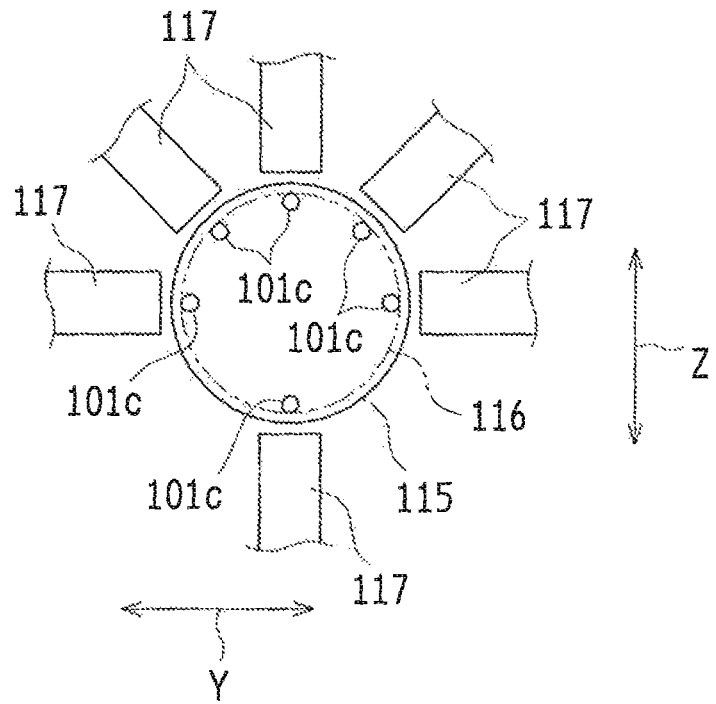
FIG. 10 is a plan view illustrating an exemplary shared hole of the drive substrate.
Figure 11:
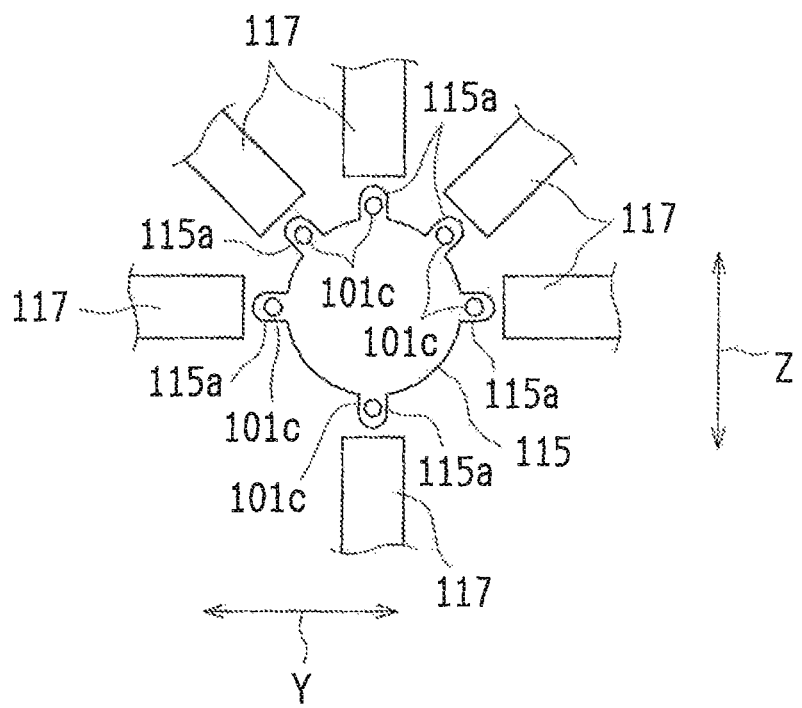
FIG. 11 is a plan view illustrating another exemplary shared hole of the drive substrate.

For example, as illustrated in FIG. 10, the shared hole 115 is a circular hole larger than a smallest circumference 116 encompassing the respective terminals 101c of the semiconductor laser 101. Alternatively, as illustrated in FIG. 11, the shared hole 115 may be an irregular-shaped hole that has regions 115a whose diameters are larger than the outer diameters of the respective terminals 101c. The terminals 101c of the semiconductor laser 101 are to be inserted into the respective regions 115a. In both cases, the respective terminals 101c of the semiconductor laser 101 can be displaced at the inside of the shared hole 115. As the shared hole 115, a hole with another shape may be employed.

In view of this, even if the respective terminals 101c of the semiconductor laser 101 are inserted into the shared hole 115 of the drive substrate 113, the shared hole 115 does not forcibly determine the positions of the respective terminals 101c of the semiconductor laser 101. Additionally, even if the respective terminals 101c are in contact with the inner circumference of the shared hole 115, the terminals 101c can be easily bent, thus allowing escaping from the inner circumference. Accordingly, the load is not applied on the respective terminals 101c of the semiconductor laser 101. Therefore, the direction, the position, and the rotation angle of the light emission surface of the semiconductor laser 101 adjusted and set at the inside of the cylindrical body 111a of the side plate 111 are not shifted.

Figure 12:
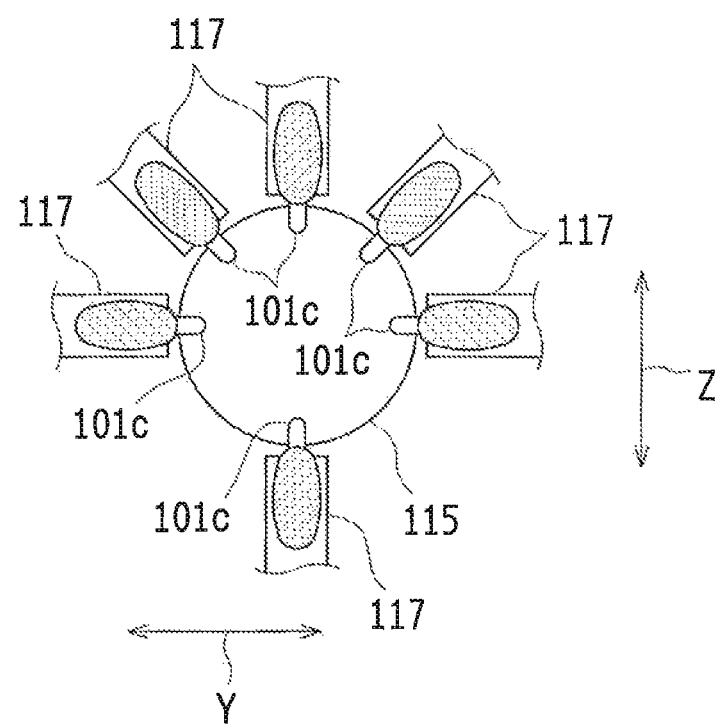
FIG. 12 is a plan view illustrating a state where respective terminals of the semiconductor lasers inserted into the shared hole of the drive substrate are bent and soldered.

Afterwards, as illustrated in FIG. 12, the respective terminals 101c of the semiconductor laser 101 are radially bent. Wiring patterns 117 corresponding to the respective terminals 101c are formed at parts outside of the peripheral edges of the shared hole 115 at the drive substrate 113. Radially bending the respective terminals 101c allows approximating the terminals 101c to the respective wiring patterns 117, allowing the terminals 101c to almost overlap with the wiring patterns 117. At this time, since the respective terminals 101c are radially bent, a force in a specific direction does not act on the semiconductor laser 101. Moreover, just bending the respective terminals 101c does not apply a large force on the semiconductor laser 101. Accordingly, the direction, the position, and the rotation angle of the light emission surface of the semiconductor laser 101 are not shifted.

Thus, in a state where the terminals 101c are approximated and almost overlap with the respective wiring patterns 117, the terminals 101c are soldered to the respective wiring patterns 117. This couples the respective semiconductor lasers 101 to the driving circuit formed on the drive substrate 113, allowing driving the respective semiconductor lasers 101 by the driving circuit.

Figure 13:
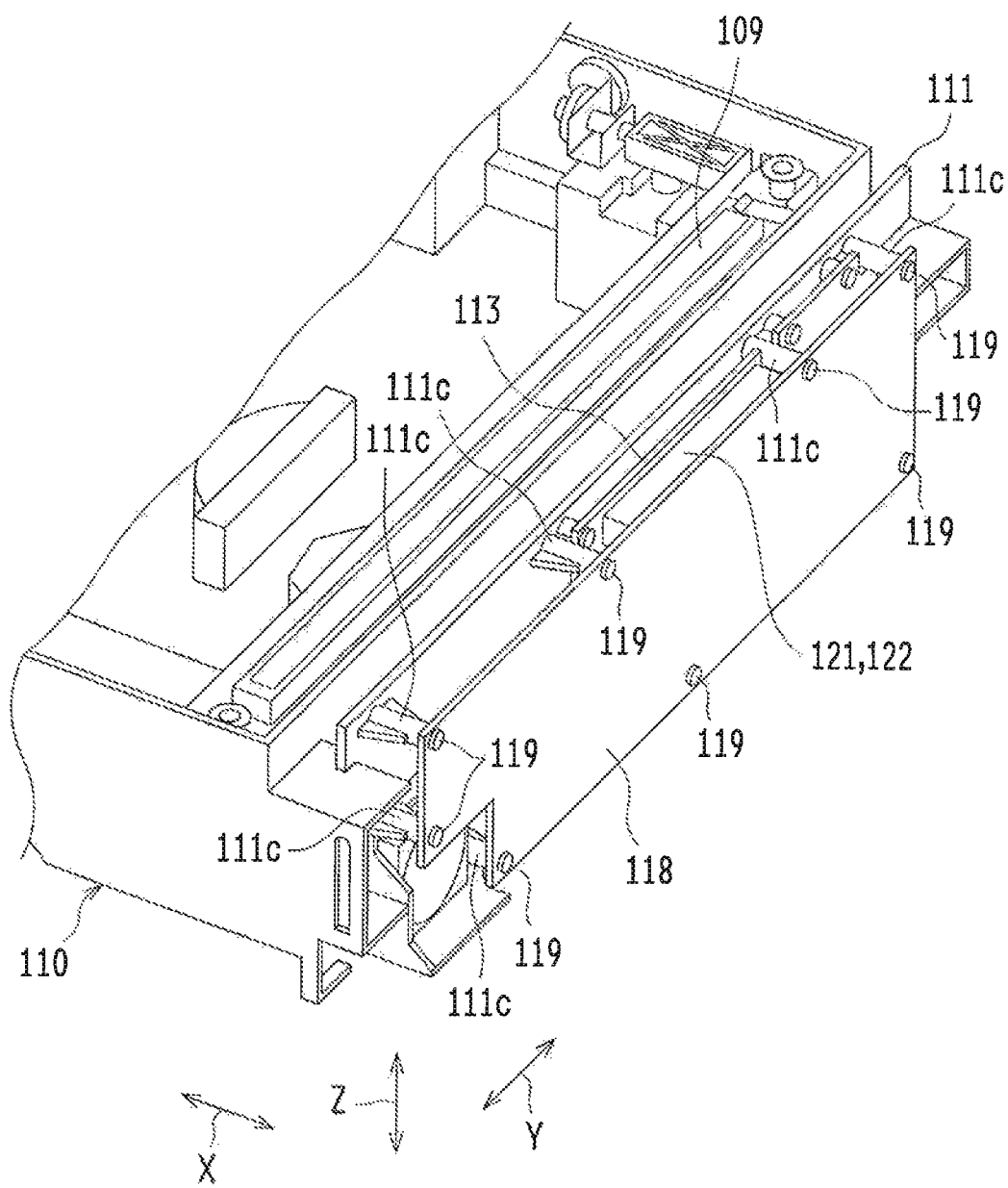
FIG. 13 is a perspective view illustrating a state where a control substrate for controlling the drive substrate is secured to a second specified position at the side plate of the housing.

The following describes a control substrate with a control circuit for controlling the driving circuit of the drive substrate 113 in detail. FIG. 13 is a perspective view illustrating a state where a control substrate 118 is secured to the second specified position at the side plate 111 of the housing 110. As illustrated in FIG. 13, the control substrate 118 is a substrate smaller than the side plate 111 and is larger than the drive substrate 113. The control substrate 118 has screw holes at a plurality of locations on the peripheral edge portions. Portions of the respective screw holes at the control substrate 118 are brought in contact with respective bosses 111c (illustrated in FIG. 5). The bosses 111c have the same height and project from the side plate 111. Screws 119 are screwed into holes of the respective bosses 111c through the respective screw holes, thus securing the control substrate 118 to the second specified position.

Here, the respective bosses 111b at the side plate 111 for supporting the drive substrate 113 have the same height. The respective bosses 111c at the side plate 111 for supporting the control substrate 118 have the same height and are higher than the respective bosses 111b. In view of this, the drive substrate 113 overlaps with the control substrate 118 in parallel to the side plate 111. Since the control substrate 118 is larger than the drive substrate 113, the control substrate 118 covers the entire drive substrate 113. Further, since the drive substrate 113 and the control substrate 118 are smaller than the side plate 111, this avoids the drive substrate 113 and the control substrate 118 to protrude from the outer peripheral edge of the side plate 111.

A first connector 121 is secured to the drive substrate 113 while a second connector 122 is secured to the control substrate 118. Simultaneous with mounting of the control substrate 118 to the side plate 111, the first connector 121 and the second connector 122 are coupled.

Figure 14:
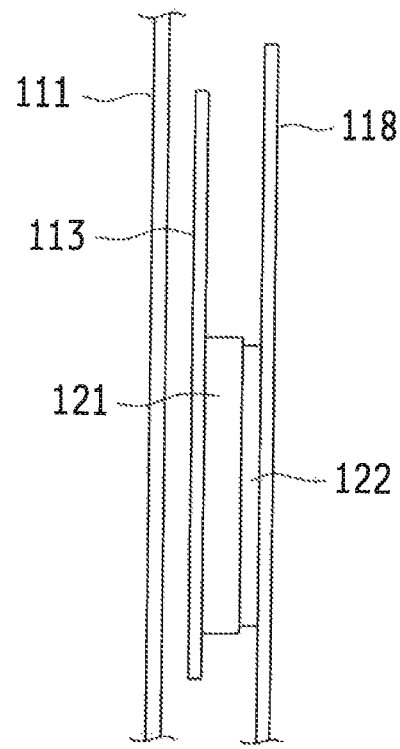
FIGS. 14A and 14B are a plan view and a side view schematically illustrating a state where a first connector of the drive substrate and a second connector of the control substrate are coupled.
Figure 14:
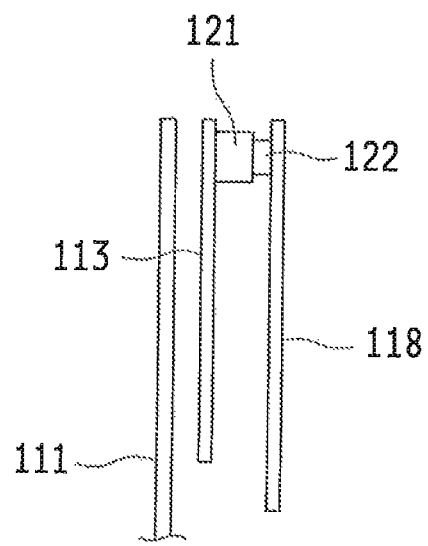

FIGS. 14A and 14B are a plan view and a side view schematically illustrating a state where the first connector 121 of the drive substrate 113 and the second connector 122 of the control substrate 118 are coupled. As illustrated in FIGS. 14A and 14B, the drive substrate 113 is secured to the first specified position at the side plate 111, and the control substrate 118 is secured to the second specified position at the side plate 111. This determines the positional relationship between the drive substrate 113 and the control substrate 118. This also determines the positional relationship between the first connector 121 of the drive substrate 113 and the second connector 122 of the control substrate 118. In view of this, portions of the respective screw holes at the control substrate 118 are brought in contact with the respective bosses 111c at the side plate 111 to arrange the control substrate 118 at the second specified position simultaneous with the coupling of the first connector 121 and the second connector 122. Subsequently, respective screws 119 are screwed into the holes of the respective bosses 111c through the respective screw holes at the control substrate 118 to secure the control substrate 118 to the second specified position. This allows holding a coupling state of the first connector 121 and the second connector 122 (Board to Board).

Thus, with the light scanning device 11 of this embodiment, the semiconductor lasers 101 are secured to the inside of the respective cylindrical bodies 111a at the side plate 111 of the housing 110 with the directions, the positions, and the rotation angles of the light emission surfaces of the semiconductor lasers 101 adjusted and set. Then, the drive substrate 113 is secured to the first specified position at the side plate 111 of the housing 110. Simultaneous with this, by the semiconductor laser 101, the six terminals 101c of the semiconductor laser 101 are inserted into the one shared hole 115 of the drive substrate 113. A mounting position of the semiconductor laser 101 is freely set within a range where the respective terminals 101c of the semiconductor laser 101 can be displaced. After that, the respective terminals 101c of the semiconductor laser 101 are soldered to the respective wiring patterns 117 of the drive substrate 113. Accordingly, the load is not applied on the respective terminals 101c of the semiconductor laser 101. Therefore, the position, the direction, and the rotation angle of the light emission surface of the semiconductor laser 101 are not shifted.

The drive substrate 113 is secured to the first specified position while the control substrate 118 is secured to the second specified position. This allows directly coupling the first connector 121 of the drive substrate 113 and the second connector 122 of the control substrate 118, allowing achieving a downsizing of the light scanning device 11.

Further, the drive substrate 113 is secured to the first specified position at the side plate 111 with smaller area of the housing 110. The control substrate 118 covers the entire drive substrate 113. The drive substrate 113 overlaps with the control substrate 118 in parallel to the side plate 111. This avoids the drive substrate 113 and the control substrate 118 to protrude from the outer peripheral edge of the side plate 111. In view of this, the mounting spaces for the drive substrate 113 and the control substrate 118 can be minimized, allowing downsizing of the light scanning device 11.

The preferred embodiments according to the present invention are described above with reference to the attached drawings; however, it is needless to say that the present invention is not limited to the above examples. It would be obvious that an ordinary skilled person conceives various modifications and corrections within scopes defined in the claims, and it should be understood that those modified examples fall within the technical scope of the present invention.

That is, the present invention can be embodied and practiced in other different forms without departing from the spirit and essential characteristics of the present invention. Therefore, the above-described embodiments are considered in all respects as illustrative and not restrictive. The scope of the invention is indicated by the appended claims rather than by the foregoing description. All variations and modifications falling within the equivalency range of the appended claims are intended to be embraced therein.

This application claims priority on Japanese Patent Application No. 2012-050654 filed in Japan on Mar. 7, 2012, the entire content of which is incorporated herein by reference. Moreover, all documents cited in this specification are herein incorporated by reference.

INDUSTRIAL APPLICABILITY

The present invention is effective to a light scanning device, a method for manufacturing the light scanning device, and an image forming apparatus with the light scanning device. The present invention can be employed for an application where reducing a load applied on terminals of respective light-emitting elements and directly coupling a drive substrate (a first substrate) and a control substrate (a second substrate) are indispensable.

DESCRIPTION OF REFERENCE SIGNS 11 light scanning device
12 developing apparatus
13 photosensitive drum (scan object)
14 drum cleaning apparatus
15 charging unit
17 fixing apparatus
21 intermediate transfer belt
101 semiconductor laser (light-emitting element)
102 polygonal mirror
103 collimator lens
104 first mirror
105 cylindrical lens
106 second mirror
107 first fθ lens
108 emission turning mirror
109 second fθ lens
110 housing
111 side plate (wall section of housing)
111a cylindrical body (secured section)
111b, 111c boss
112 aperture
113 drive substrate (first substrate)
114, 119 screw
115 shared hole
116 circumference
117 wiring pattern
118 control substrate (second substrate)
121 first connector
122 second connector

The invention claimed is:

1. A light scanning device including a plurality of light-emitting elements for scanning a scan object with respective light beams emitted from the respective light-emitting elements, the light scanning device comprising:
   secured sections provided in a housing of the light scanning device, the respective light-emitting elements being secured to the secured sections;
   a first substrate that includes a first connector, mounting positions of the respective light-emitting elements to the first substrate being displaceable, the respective light-emitting elements being coupled to the first substrate; and
   a second substrate that includes a second connector coupled to the first connector, wherein
   the first connector and the second connector are respectively secured to the first substrate and the second substrate, and
   the first connector and the second connector are coupled to each other and the first substrate and the second substrate are respectively secured to a first specified position of the housing of the light scanning device and a second specified position of the housing of the light scanning device.

2. The light scanning device according to claim 1, wherein the second substrate is larger than the first substrate, the second substrate covering the first substrate and being secured to the second specified position.

3. The light scanning device according to claim 1, wherein the first substrate includes shared holes by the respective light-emitting elements, respective terminals of the light-emitting element being inserted together into the shared hole, the respective terminals of the light-emitting element being moved at an inside of the shared hole so as to displace the mounting positions of the respective light-emitting elements.

4. The light scanning device according to claim 3, wherein the shared hole is larger than a smallest circumference encompassing the respective terminals of the light-emitting element.

5. The light scanning device according to claim 3, wherein respective regions at the shared hole into which the respective terminals of the light-emitting element are to be inserted are formed larger than outer diameters of the respective terminals.

6. The light scanning device according to claim 3, wherein a wiring pattern is formed at a part outside of a peripheral edge of the shared hole at the first substrate, the terminals of the respective light-emitting elements being coupled to the wiring patterns.

7. The light scanning device according to claim 1, wherein a housing of the light scanning device includes a plurality of wall sections, and
the first substrate and the second substrate are arranged in parallel to one wall section among the respective wall sections, the first substrate and the second substrate being formed smaller than the one wall section.

8. The light scanning device according to claim 7, wherein the one wall section is a wall section that has a smallest area among the respective wall sections.

9. The light scanning device according to claim 1, wherein the respective light-emitting elements are laser diodes that emit a plurality of light beams.

10. An image forming apparatus, comprising
the light scanning device according to claim 1, wherein
the light scanning device is configured to form a latent image on a scan object, the light scanning device being configured to develop the latent image on the scan object into a visible image, the light scanning device being configured to transfer and form the visible image from the scan object to a paper sheet.

11. A method for manufacturing a light scanning device including a plurality of light-emitting elements for scanning a scan object with respective light beams emitted from the respective light-emitting elements, the method for manufacturing the light scanning device comprising:
a step of securing the respective light-emitting elements to secured sections provided in a housing of the light scanning device;
a step of securing a first substrate to a first specified position specified relative to the housing of the light scanning device;
a step of coupling the respective light-emitting elements to the first substrate by adjusting and configuring mounting positions on the first substrate where the respective light-emitting elements are displaceable; and
a step of securing the second substrate to a second specified position specified relative to the housing of the light scanning device by coupling a second connector of the second substrate to a first connector of the first substrate, wherein
the first connector and the second connector are secured respectively to the first substrate and the second substrate.

* * * * *